(12) United States Patent
Liu

(10) Patent No.: US 9,925,599 B2
(45) Date of Patent: Mar. 27, 2018

(54) PROTECTION TOOL FOR AN ELECTRONIC DRILL

(71) Applicant: Xuan-Cheng Liu, Kaohsiung (TW)

(72) Inventor: Xuan-Cheng Liu, Kaohsiung (TW)

(\*) Notice: Subject to any disclaimer, the term of this patent is extended or adjusted under 35 U.S.C. 154(b) by 253 days.

(21) Appl. No.: 14/662,254

(22) Filed: Mar. 19, 2015

(65) Prior Publication Data
US 2016/0001378 A1 Jan. 7, 2016

(30) Foreign Application Priority Data

Jul. 3, 2014 (TW) .............................. 103123020 A

(51) Int. Cl.
| | |
|---|---|
| B23Q 11/00 | (2006.01) |
| B23B 45/00 | (2006.01) |
| B25F 1/04 | (2006.01) |
| B23G 1/00 | (2006.01) |
| B23Q 3/155 | (2006.01) |
| B23B 49/00 | (2006.01) |

(Continued)

(52) U.S. Cl.
CPC .......... *B23B 45/001* (2013.01); *B23B 45/008* (2013.01); *B23B 49/008* (2013.01); *B23G 1/00* (2013.01); *B23Q 3/15506* (2013.01); *B25F 1/04* (2013.01); *B25F 5/003* (2013.01); *B25F 5/029* (2013.01); *B23B 45/02* (2013.01); *B23B 2251/52* (2013.01); *Y10T 408/37* (2015.01); *Y10T 483/1755* (2015.01); *Y10T 483/1798* (2015.01)

(58) Field of Classification Search
CPC ... B23B 45/001; B23B 49/008; B23B 45/008; B23B 2251/52; B23B 45/02; B25F 5/003; B25F 5/029
See application file for complete search history.

(56) References Cited

U.S. PATENT DOCUMENTS

| | | | |
|---|---|---|---|
| 2,679,770 | A | 6/1954 | Carter |
| 4,604,005 | A | 8/1986 | Russ |

(Continued)

FOREIGN PATENT DOCUMENTS

| | | |
|---|---|---|
| DE | 19737892 A1 | 5/1998 |
| DE | 19951264 A1 | 4/2001 |
| DE | 10045617 A1 | 4/2002 |

OTHER PUBLICATIONS

Liu, Title of Invention: Electronic Drill with Revolving Replacable Drilling Heads, U.S. Appl. No. 14/658,263, filed Mar. 16, 2015.

*Primary Examiner* — Daniel Howell
*Assistant Examiner* — Paul M Janeski
(74) *Attorney, Agent, or Firm* — Winston Hsu

(57) ABSTRACT

A protection tool for an electronic drill provides various functions when drilling is carried out. The electronic drill has a front end with a through hole located at the front end and a drill head extending through out the through hole. The protection tool is moveably mounted at the front end of the electronic drill along an operation direction. A guard plate includes a pore aligning with the through hole and provides pass way for the drill head. A supporting frame is assembled with the guard plate and is moveably mounted at the front end of the electronic drill along the operation direction, so that the guard plate is positioned at a variable distance from the front end according to the movement of the supporting frame with respect to the front end.

5 Claims, 13 Drawing Sheets

(51) Int. Cl.
  *B25F 5/00*    (2006.01)
  *B25F 5/02*    (2006.01)
  *B23B 45/02*    (2006.01)

(56) References Cited

U.S. PATENT DOCUMENTS

| | | |
|---|---|---|
| 4,928,381 A | 5/1990 | Yaguchi |
| 5,022,131 A | 6/1991 | Hobbs |
| 5,065,498 A | 11/1991 | McKenzie |
| 5,346,453 A | 9/1994 | Rivera-Bottzeck |
| 5,597,275 A | 1/1997 | Hogan |
| 5,893,685 A | 4/1999 | Olson |
| 6,145,162 A * | 11/2000 | Deutschenbaur ..... B23B 49/026 144/252.1 |
| 8,007,424 B2 | 8/2011 | Moser |
| 8,202,027 B2 * | 6/2012 | Katagiri ............... B23Q 11/005 175/209 |
| 9,211,620 B2 | 12/2015 | Nagy |
| 9,211,622 B2 | 12/2015 | Nagy |
| 9,242,326 B2 | 1/2016 | Nagy |
| 9,421,681 B2 | 8/2016 | Zhang |
| 2004/0146367 A1 * | 7/2004 | Gerhardt ............. B23Q 9/0028 408/110 |
| 2009/0298658 A1 | 12/2009 | Yeh |
| 2011/0131766 A1 * | 6/2011 | Imaschewski .......... B25F 5/026 16/426 |
| 2014/0329654 A1 | 11/2014 | Andriolo |
| 2015/0021061 A1 | 1/2015 | Nagy |

\* cited by examiner

PROTECTION TOOL FOR AN ELECTRONIC DRILL

BACKGROUND OF THE INVENTION

1. Field of the Invention

The invention relates to a protection tool, and more particularly, to a protection tool mounted at the front end of an electronic drill.

2. Description of the Prior Art

Electronic drills are fully developed product in the industry, mostly used for drilling holes at the walls, ceilings, wood plates, etc. for follow-up application such as mounting a fan, a lamp, or hanging tools. Some fixture elements like the screws or nails can also be easily implanted with the help of the electronic drills.

Since the electronic drill has been diversely implemented, it usually comes with drill heads with various types and replacement of the drill heads is necessary. Frequent replacement of the drill heads brings up quite a few problems, though. First of all, the drill head may deform or fall out during the drilling if not securely clamped. Second, high temperature on the drill head due to the contact friction is a substantial cause of burning the user when the drill head is to be replaced immediately. Third, a lot of time is always needed for replacing the drill heads, especially when each drill has its dedicated mechanism for replacing the drill heads, needless to say people should also keep the unused drill heads in good hands. Fourth, it is always a challenge to properly position the drill head at the place and have the drill head stick perpendicularly into the object, with the knowledge of how deep it has already dug. Last, collecting the drill dust and saving as mush cleaning work as possible are also one of the primary concerns for many users.

SUMMARY OF THE INVENTION

To take care of the above mentioned problem so that people need not experience such embarrassing situation when using an electronic drill, embodiments of the invention provide electronic drill with revolving replaceable drilling heads.

An embodiment of the invention provides a protection tool for an electronic drill. The electronic drill has a front end with a through hole located at the front end and a drill head extending throughout the through hole. The protection tool is moveably mounted at the front end of the electronic drill along an operation direction and includes a guard plate and a supporting frame. The guard plate includes a pore aligning with the through hole. The supporting frame is assembled with the guard plate and is moveably mounted at the front end of the electronic drill along the operation direction, so that the guard plate is positioned at a variable distance from the front end according to the movement of the supporting frame with respect to the front end.

According to the embodiment of the invention, the supporting frame includes a plurality of rods and the electronic drill includes a plurality of grooves, each rods extending into a corresponding groove and moveable in the groove along the operation direction.

According to the embodiment of the invention, at least one of the rods includes a scale along the operation direction for showing the distance of the guard plate from the front end.

According to the embodiment of the invention, the guard plate is in parallel with the front end of the electronic drill and perpendicular to the orientation of the drill head.

According to the embodiment of the invention, the guard plate includes an upper plate and a lower plate detachably assembled together. The upper plate includes the pore and the lower plate includes a concaved dust box.

According to the embodiment of the invention, the upper plate includes a pull ring for disassembling the upper plate from the lower plate.

According to the embodiment of the invention, the lower plate includes an arm extending from the dust box and away from the upper plate.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. In the following discussion and in the claims, the terms "include" and "comprise" are used in an open-ended fashion.

Figure 1:
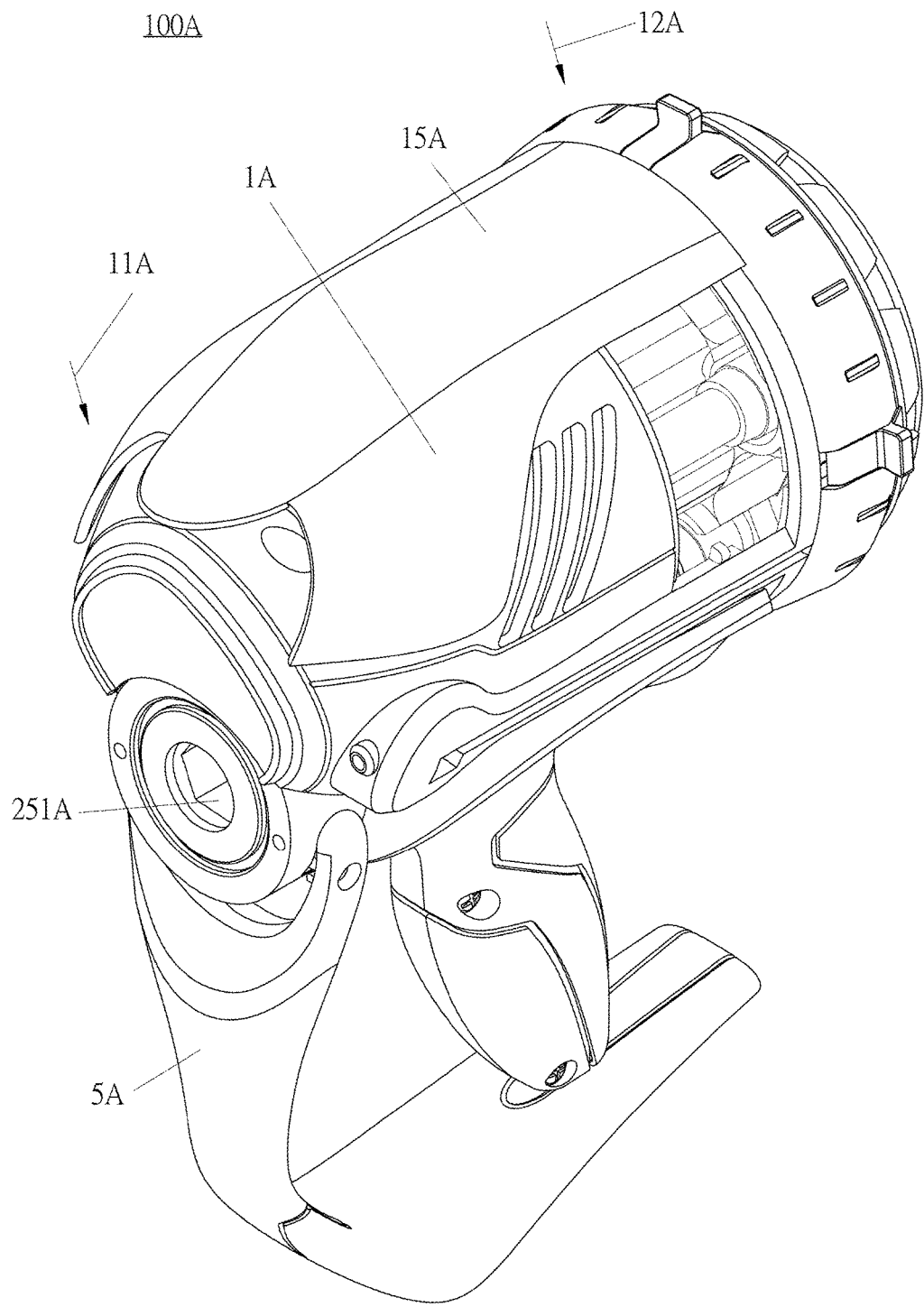
FIG. 1 is an illustration of an electronic drill with revolving replaceable drilling heads according to a first embodiment of the invention.
Figure 2:
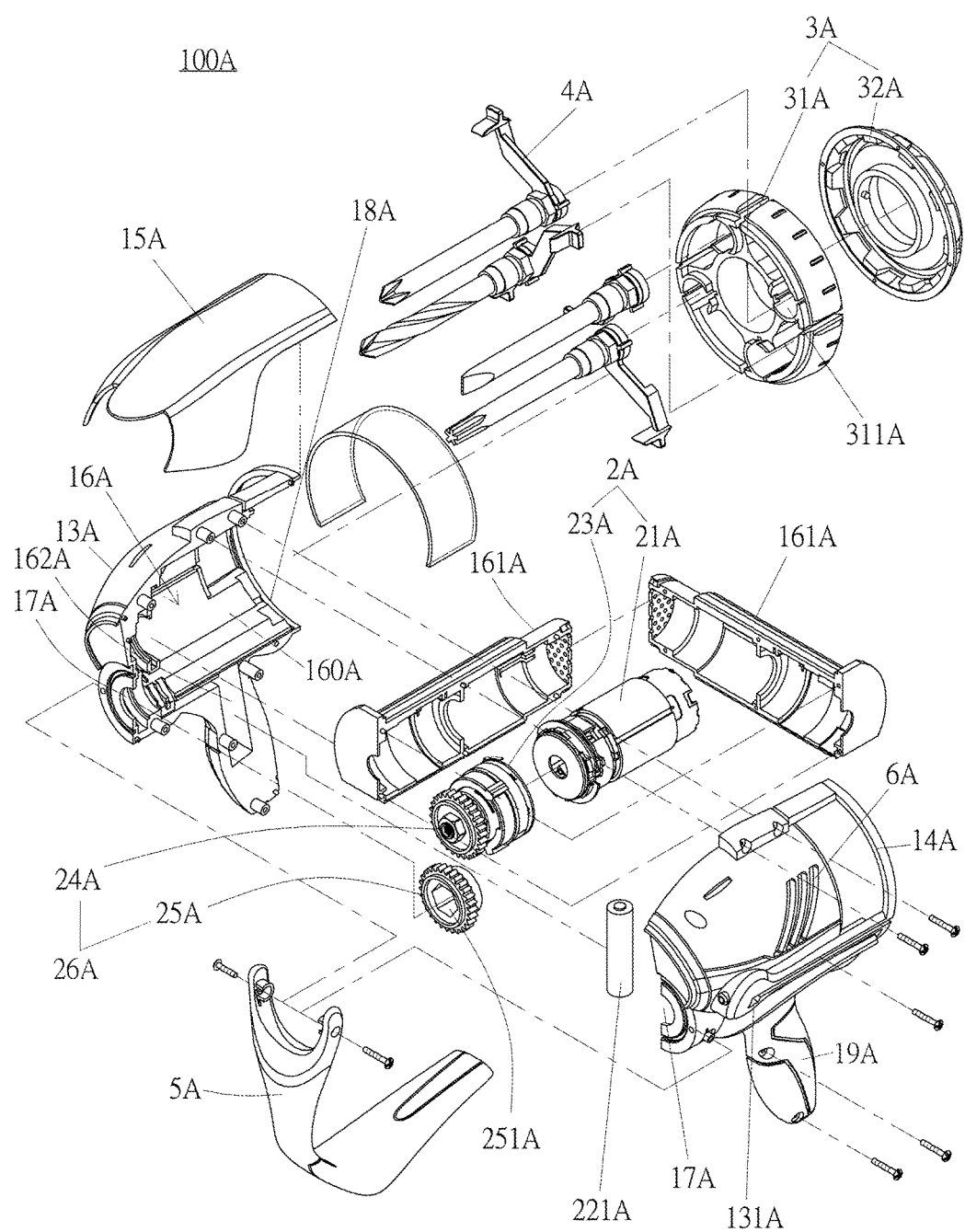
FIG. 2 is an illustration showing an exploded view of the electronic drill in FIG. 1.

Please refer to FIG. 1 and FIG. 2. FIG. 1 is an illustration of an electronic drill with revolving replaceable drilling heads according to a first embodiment of the invention and FIG. 2 is an illustration showing an exploded view of the electronic drill in FIG. 1. The electronic drill 100A includes a housing 1A having a front end 11A and a rear end 12A, a driving unit 2A, a rotary cover 3A, and a plurality of drill heads 4A. According to the first embodiment, the housing 1A is composed of a first housing 13A and a second housing 14A assembled together, with a top housing 15A assembled atop the first housing 13A and the second housing 14A. The housing 1A includes a containing room 16A, which is defined and surrounded by the first housing 13A and the second housing 14A. The housing 1A also includes a through hole 17A located at the front end 11A and an opening 18A located at the rear end 12A. The containing room 16A is connected between the opening 18A and the through hole 17A.

Figure 4:
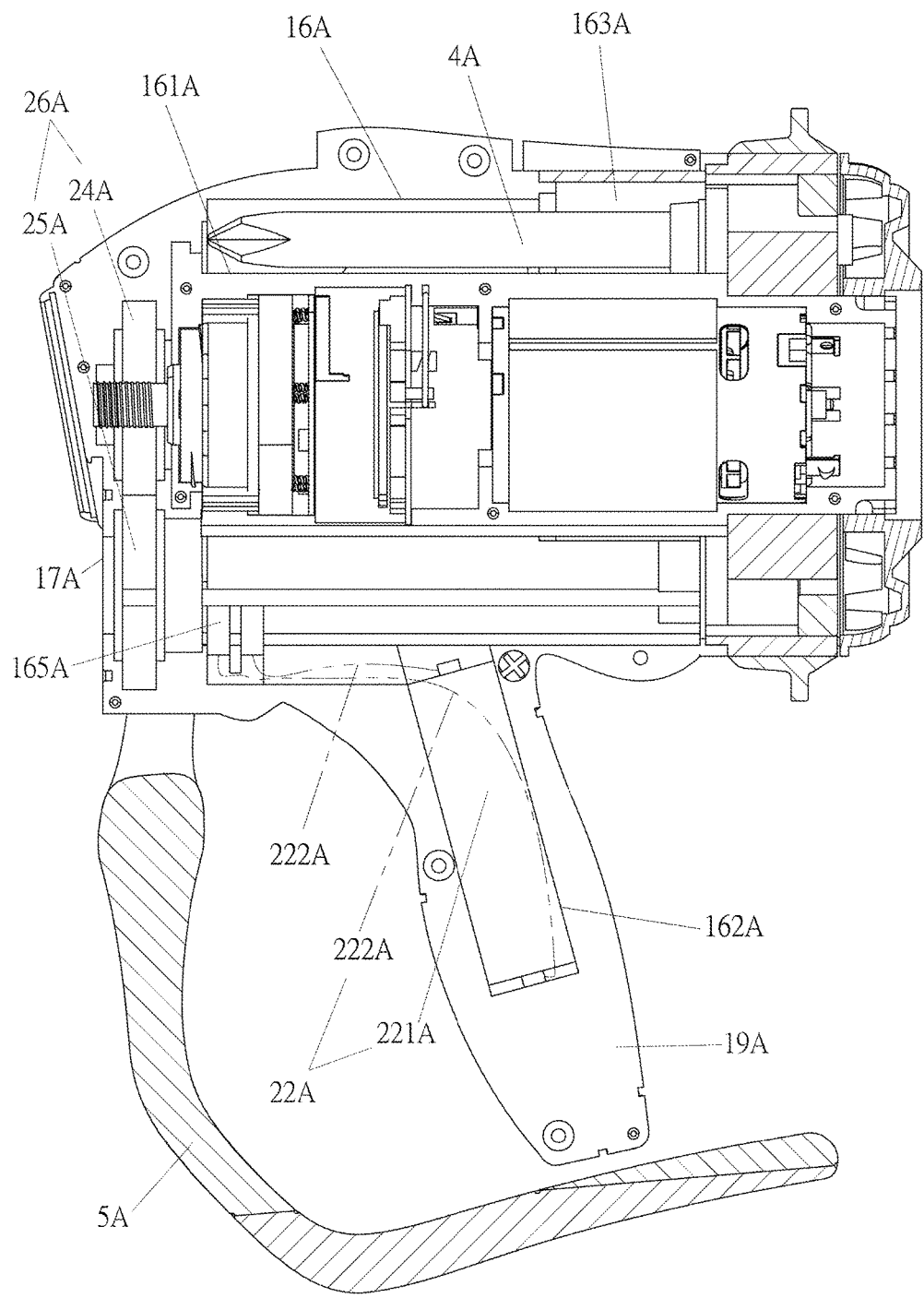
FIG. 4 is an illustration of an electronic drill according to the first embodiment showing a first partial cross-sectional view.
Figure 5A:
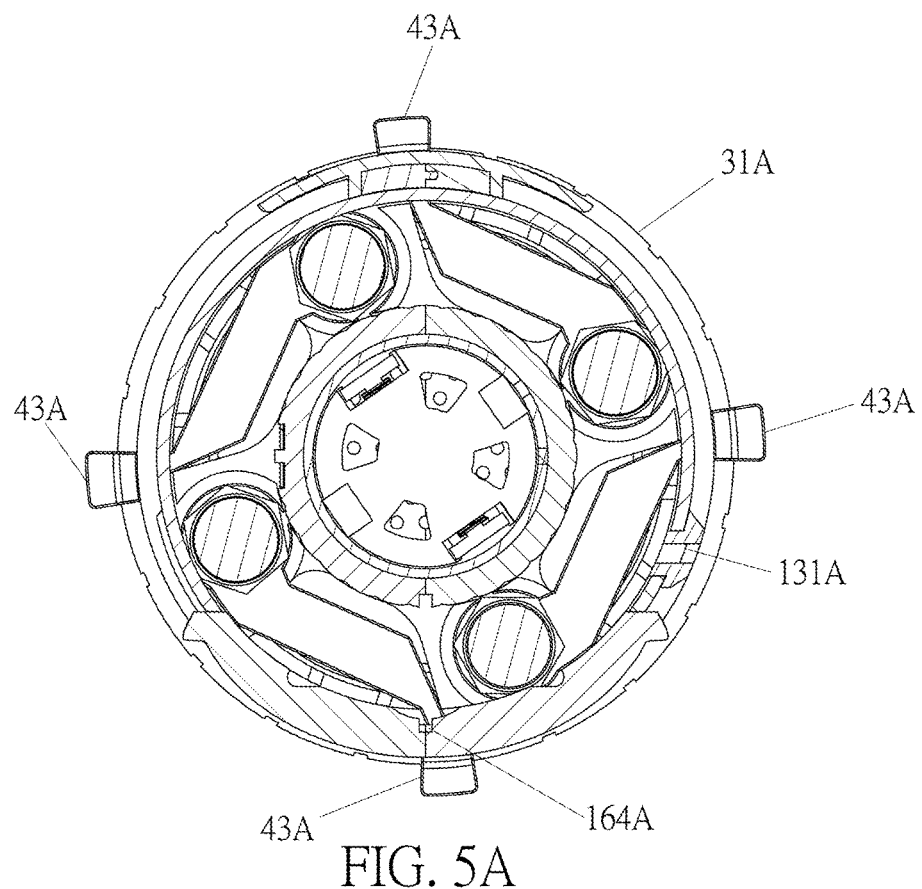
FIG. 5A is an illustration of an electronic drill according to the first embodiment showing a second partial cross-sectional view.
Figure 5B:
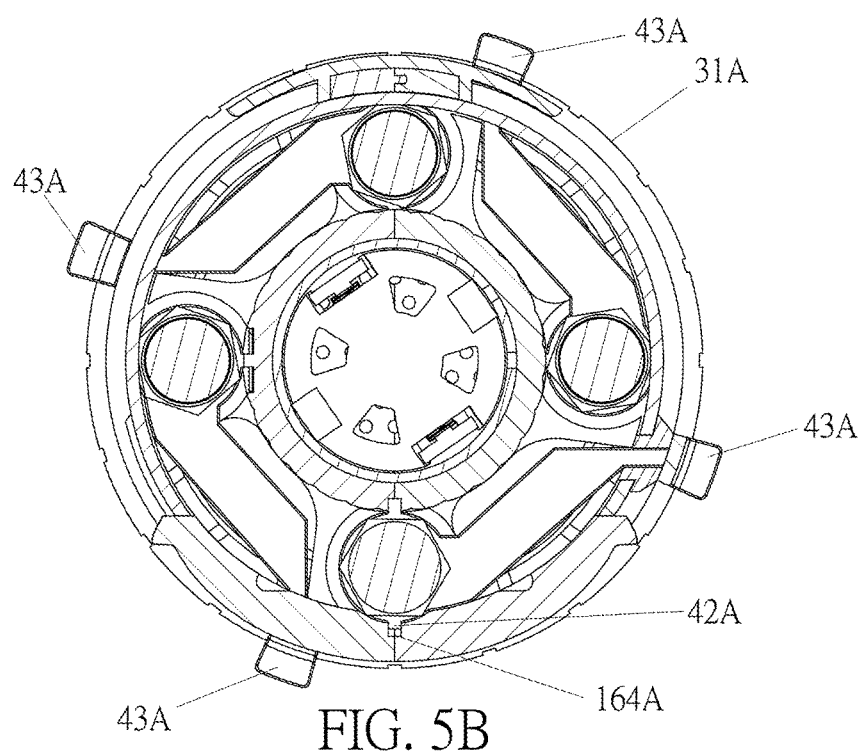
FIG. 5B is an illustration of an electronic drill according to the first embodiment showing a third partial cross-sectional view.

Please refer to FIG. 4, FIG. 5A, and FIG. 5B, together with FIG. 1 and FIG. 2. FIG. 4 is an illustration of an electronic drill according to the first embodiment showing a first partial cross-sectional view, FIG. 5A is an illustration of an electronic drill according to the first embodiment showing a second partial cross-sectional view, and FIG. 5B is an illustration of an electronic drill according to the first embodiment showing a third partial cross-sectional view. A motor container 161A is disposed within the containing room 16A. A rotary track 163A is defined between the motor container 161A and an inner wall 160A of the containing room 16A and the rotary track 163A is defined to surround the motor container 161A. A first groove 164A is disposed at the inner wall 160A extending to correspond to the through hole 17A. Also referring to FIG. 2 and FIG. 5A, a slit 131A is further included by the housing 1A, or the first housing 13A in this embodiment, that extends from the rear end 12A to the front end 11A and connects the rotary track 163A.

Please refer to FIG. 2 and FIG. 4. The driving unit 2A includes a motor 21A and a power component 22A. The motor 21A is disposed in the motor container 161A and connects to a gear set 26A through a clutch 23A. The power component 22A is disposed in a handle 19A of the housing 1A and includes a battery 221A and wirings 222A. More specifically, the handle 19A is positioned between the front end 11A and the rear end 12A and includes a power container 162A. The battery 221A is disposed in the power container 162A. A wiring slot 165A is further defined in the containing room 16A, which connects to both the motor container 161A and the power container 162A and the wirings 222A is disposed in the wiring slot 165A to connect between the battery 221A and the motor 21A so that the motor 21A can be driven by the power component 22A.

The gear set 26A is disposed outside the motor container 161A and includes a first gear 24A and a second gear 25A meshed with each other. The first gear 24A is linked and driven by the motor 21A and the second gear 25A has a rotary hole 251A in connection with the through hole 17A.

Figure 3:
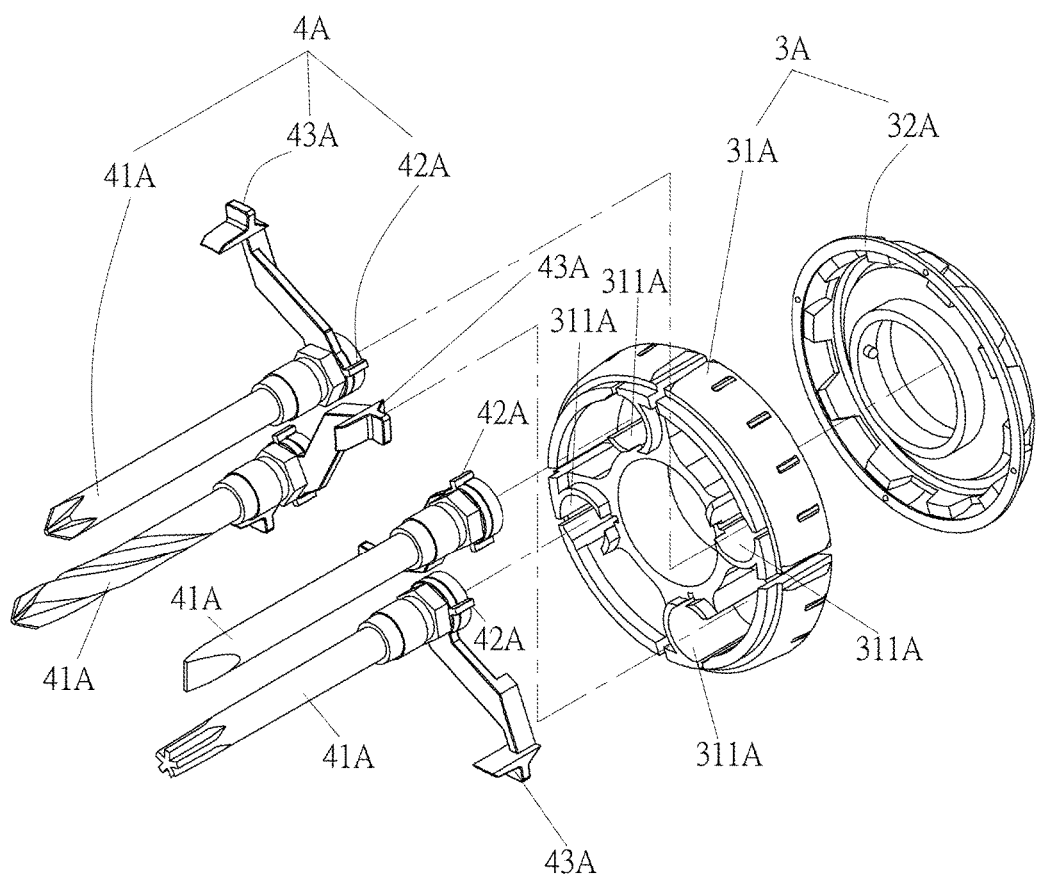
FIG. 3 is an illustration showing an exploded view of the rotary cover.

Please refer to FIG. 2, FIG. 3, and FIG. 5B. FIG. 3 is an illustration showing an exploded view of the rotary cover. The rotary cover 3A is detachably assembled to the rear end 12A of the housing 1A and covering the opening 18A. the rotary cover 3A includes a wheel 31A and a back cover 32A assembled with the wheel 31A to the opening 18A. The wheel 31A is rotatable with respect to the housing 1A and includes at least two hollow recesses 311A (four hollow recesses 311A circularly distributed in this embodiment). Each drill head 4A is detachably coupled to one of the recesses 311A and is directed toward the rotary track 163A. Various types of drill heads 4A can be used in the electronic drill 100A. Preferably, any one drill head 4A includes a working section 41A, a first protrusion 42A adapted to correspond and slide in the first groove 164A, and a push bar 43A corresponding to the slit 131A and slidable in the slit 131A.

Please refer to FIG. 3, FIG. 5A, and FIG. 5B. The drill heads 4A are freely movable in the rotary track 163A with the wheel 31A rotating with respect to the housing 1A. As any one of the drill heads 4A has its first protrusion 42A and push bar 43A aligning with the first groove 164A and the slit 131A respectively, the drill head 4A is ready to align with the rotary hole 251A and may be exerted with force on the push bar 43A, so that the drill head 4A slides in the first groove 164A with the first protrusion 42A, passing through the rotary hole 251A and the through hole 17A, so as to be engaged with and rotated by the rotary hole 251A.

Please refer to FIG. 2. In the first embodiment, the housing 1A further includes a protection plate 5A pivoted and extending from the from end 11A. The protection plate 5A is rotatable with respect to the front end 11A and has the shape of L type in this embodiment. The protection plate 5A can protect the user from being harmed by a broken drill head 4A or scattering during operation. A plurality of ventilation slits 6A is also configured to be disposed at the housing 1A and connecting the containing room 16A, so as to provide air flow in and out to dissipate heat generated by the motor 31A, the first gear 24A, and the second gear 25A.

Figure 6:
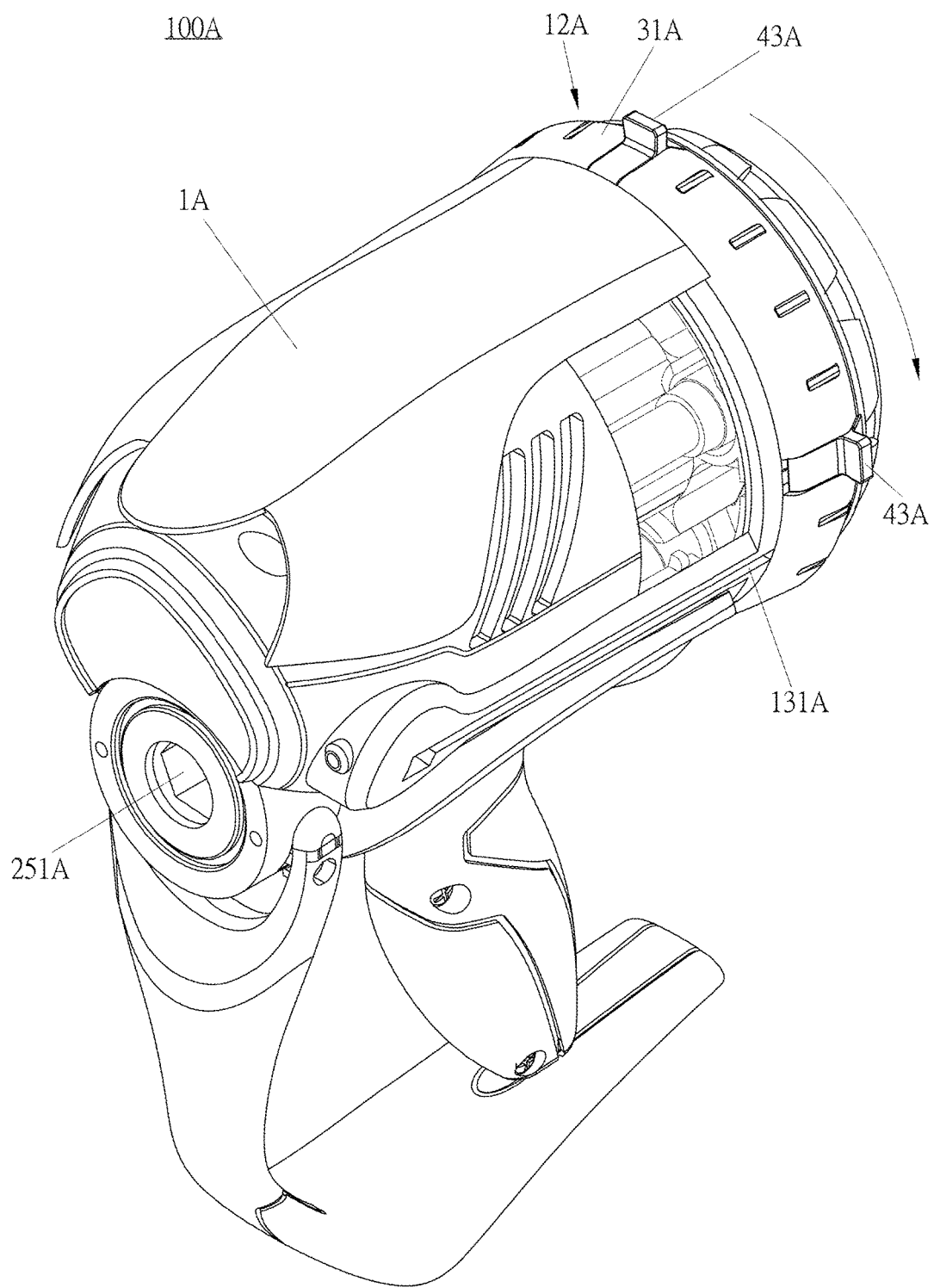
FIG. 6 to FIG. 8 are illustrations showing the operation of the electronic drill with revolving replaceable drilling heads according to the first embodiment of the invention.
Figure 7:
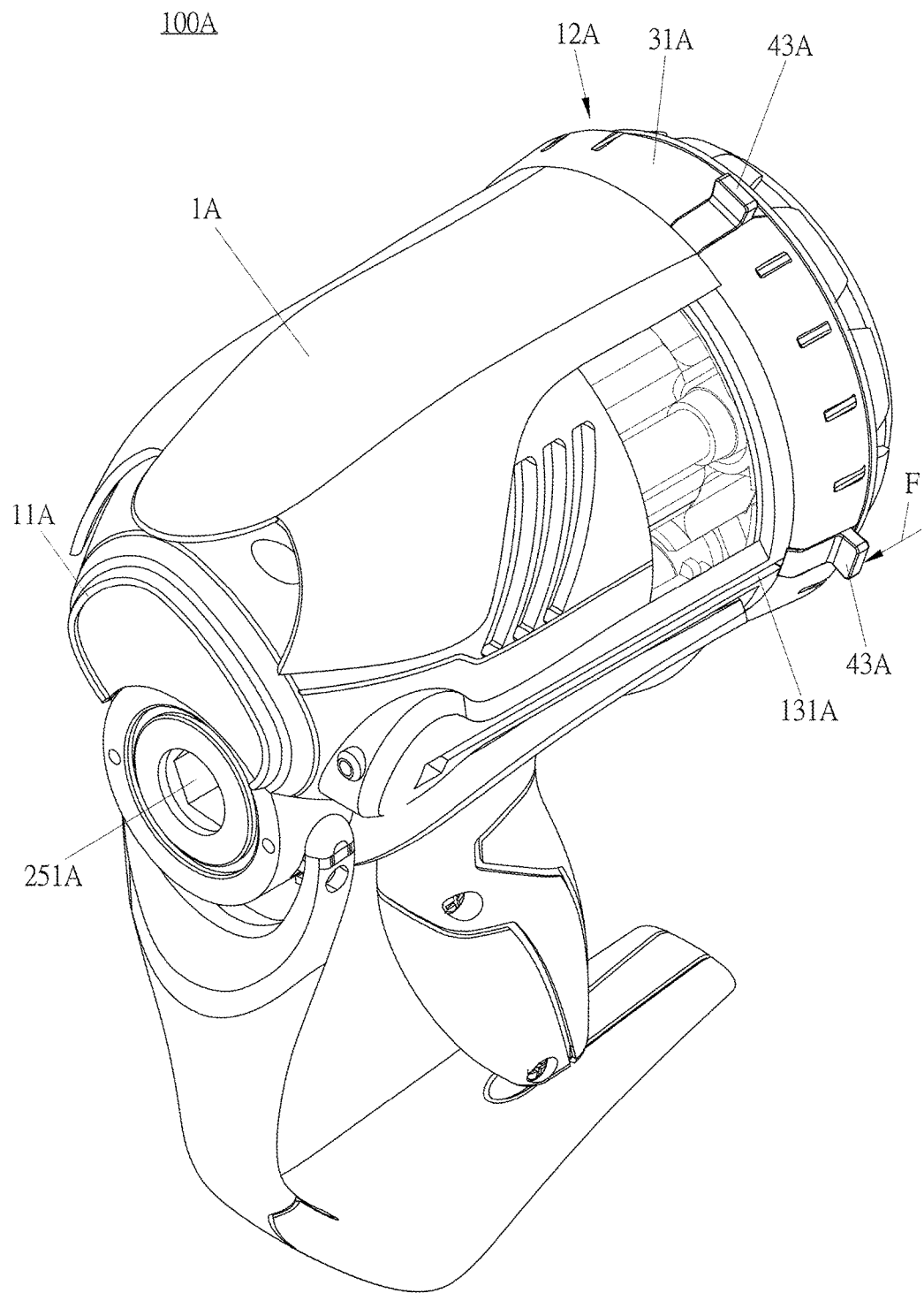
Figure 8:
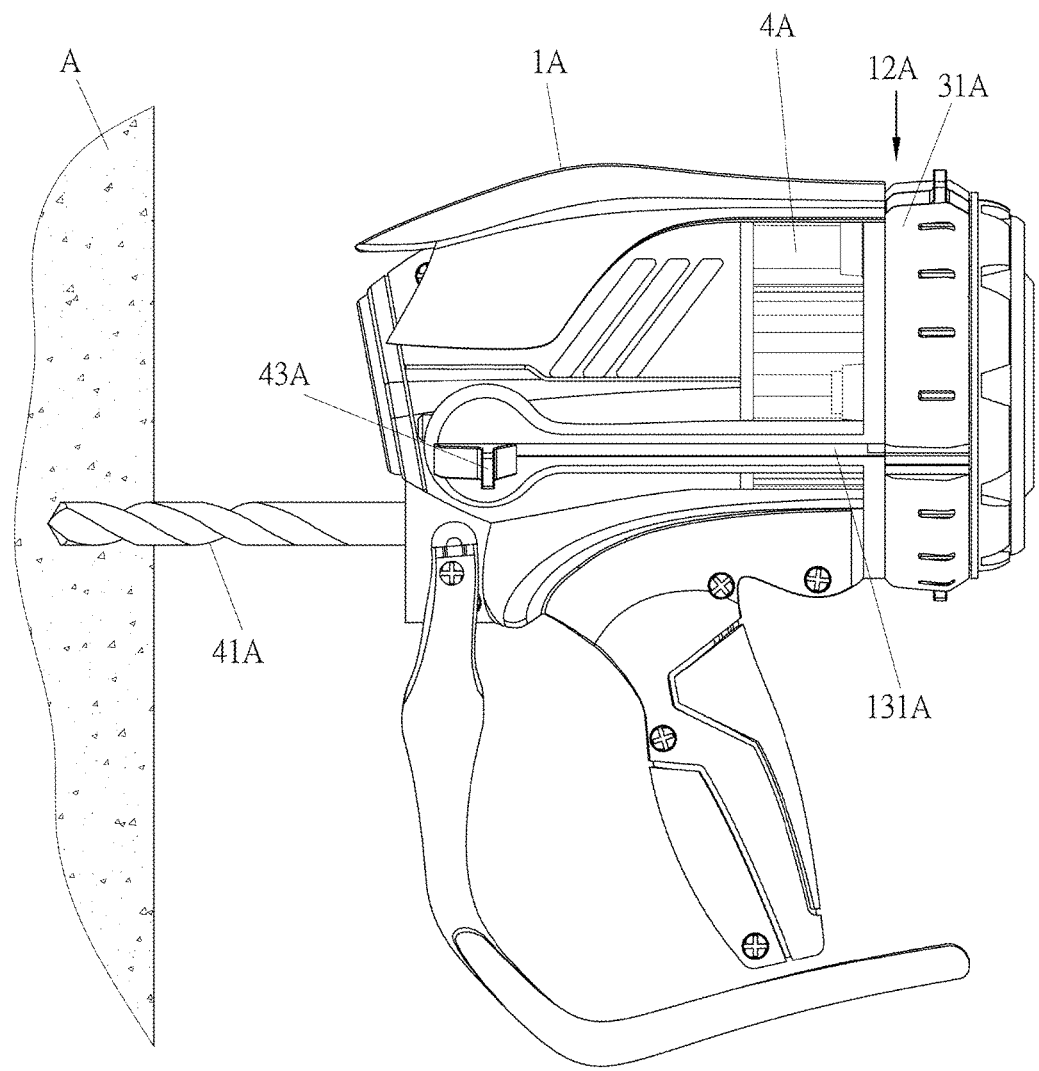

Please refer to FIG. 6 to FIG. 8, which are illustrations showing the operation of the electronic drill with revolving replaceable drilling heads according to the first embodiment of the invention. To drill a hole on a wall A, the wheel 31A is first rotated with respect to the housing 1A, so that a suitable drill head 4A can be placed at the right position, which means the first protrusion (not shown in the figures) of the drill head 4A corresponds to the first groove 164A (not shown in the figures) and the push bar 43A corresponds to the slit 131A. At this position shown in FIG. 7, pushing the push bar 43A with the force F will move the drill head 4A toward the front end 11A of the housing 1A until the drill head 4A is retained by the rotary hole 251A and the working section 41A of the drill head 4A is exposed outside the housing 1A. Drilling process is ready to carry out by aiming the working section 41A at the wall A. When the drill head 4A is to be replaced and another drill head 4A is to be used, first move the drill head 4A backward toward the rear end 12A of the housing 1A, so that the drill head 4A is fully restored to the wheel 31A, and then rotate the wheel 31A so that the push bar 43A of another drill head 4A gets to align with the slit 131A and can be move toward the front as described above.

Figure 9:
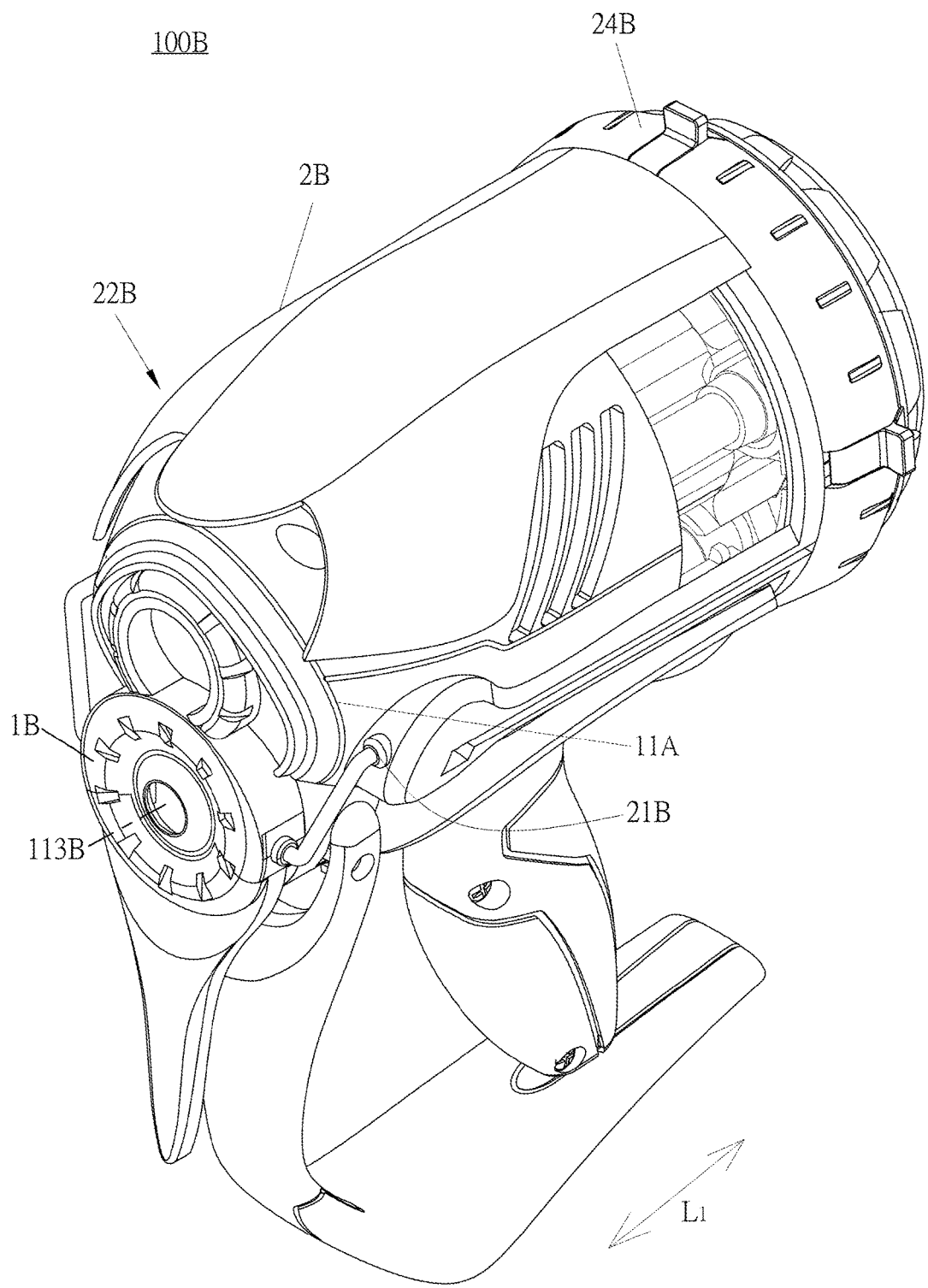
FIG. 9 is an illustration of an electronic drill with revolving replaceable drilling heads according to a second embodiment of the invention.
Figure 10:
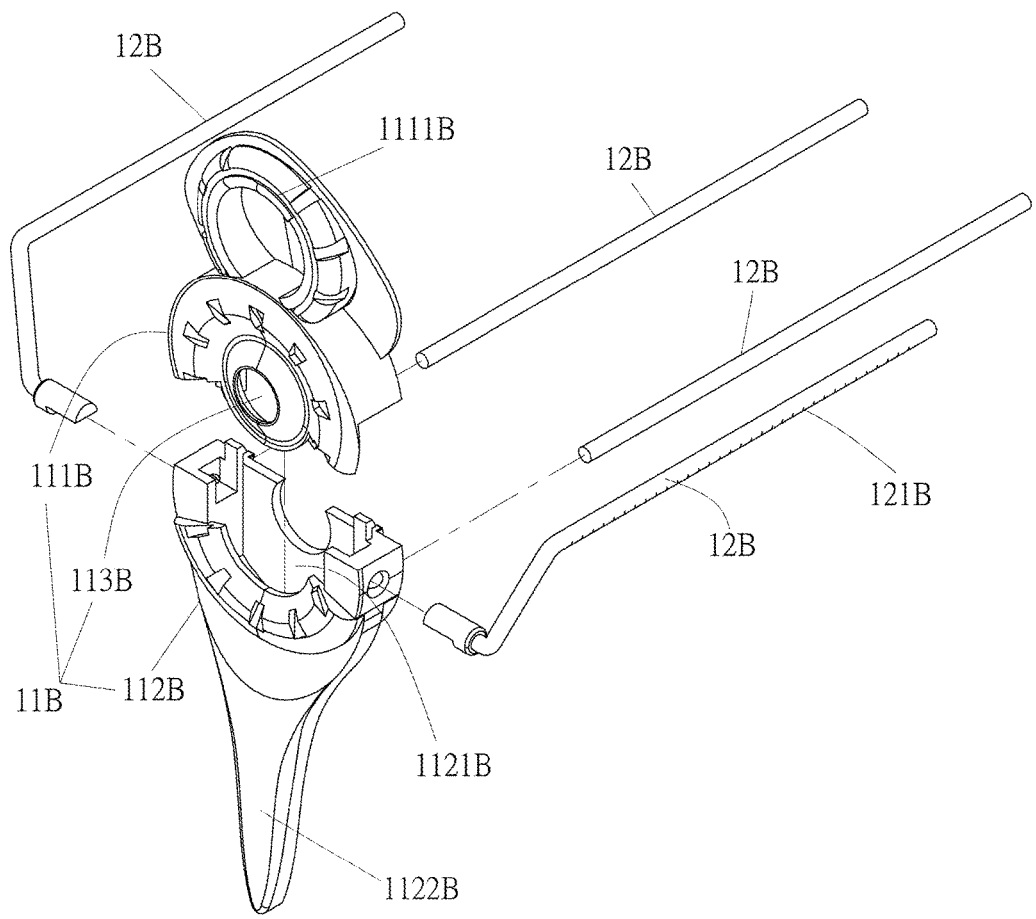
FIG. 10 is an illustration showing an exploded view of the protection tool.

Please refer to FIG. 9 and FIG. 10. FIG. 9 is an illustration of an electronic drill with revolving replaceable drilling heads according to a second embodiment of the invention and FIG. 10 is an illustration showing an exploded view of the protection tool. Besides the components and structure of the electronic drill 100A in the first embodiment, the second embodiment of the electronic drill 100B further includes a protection tool 1B, which includes a guard plate 11B and a supporting frame. The protection tool 1B is moveably mounted at the front end of the electronic drill 100B along an operation direction $L_1$. In this embodiment, the supporting frame includes a plurality of rods 12B assembled with the guard plate 11B and extending from the guard plate 11B toward the front end 11A of the electronic drill 100B. The electronic drill 100B further includes a plurality of second grooves 21B extending along the operation direction $L_1$ and providing room for movement of each rod 12B. Each rod 12B extends into a corresponding second groove 21B and moveable in the second groove 21B along the operation direction $L_1$. With such structural relation, the guard plate 11B may be moved close to or away from the front end 11A and positioned at a variable distance (for example, the distance D shown in FIG. 12) from the front end 11A according to the movement of the supporting frame with respect to the front end 11A. Besides the above embodiment, the support frame of the protection tool 1B may also be moveably mounted to any other types of electronic drills via tracks, a mounting kit assembled to the electronic drill in advance, etc.

Figure 12:
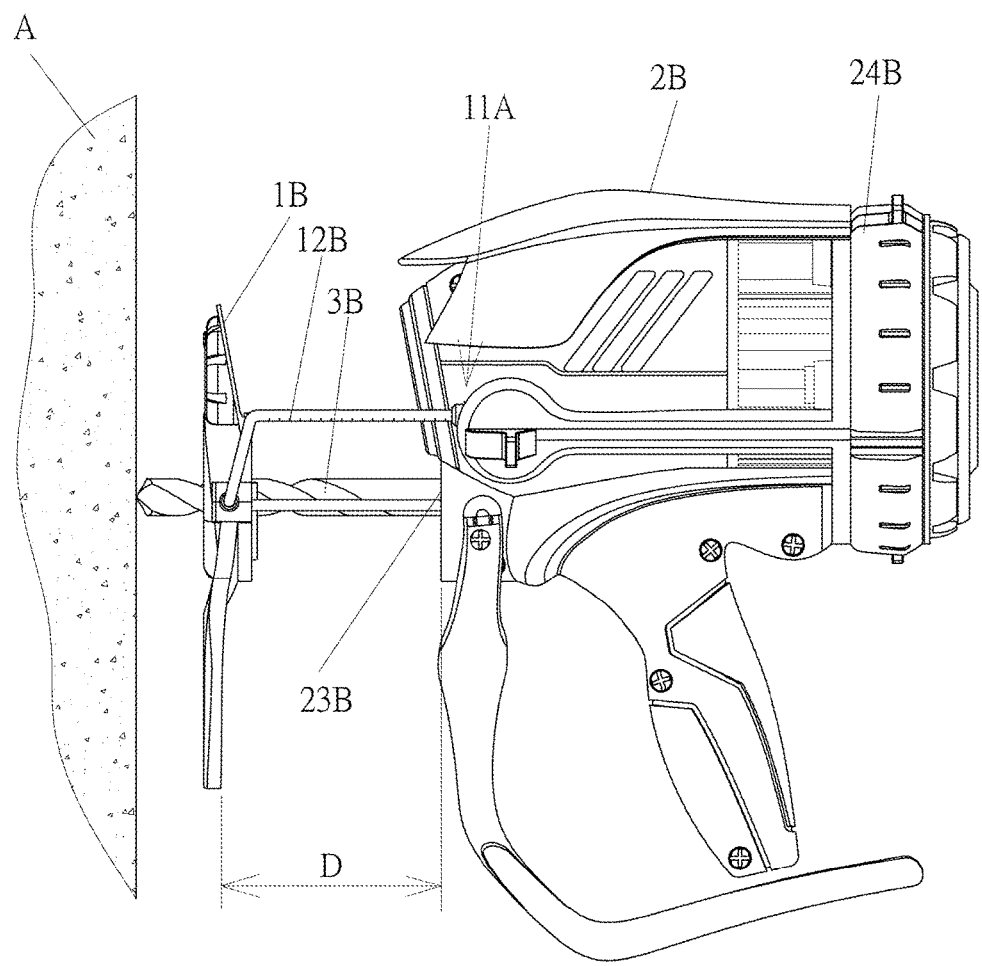
Figure 13:
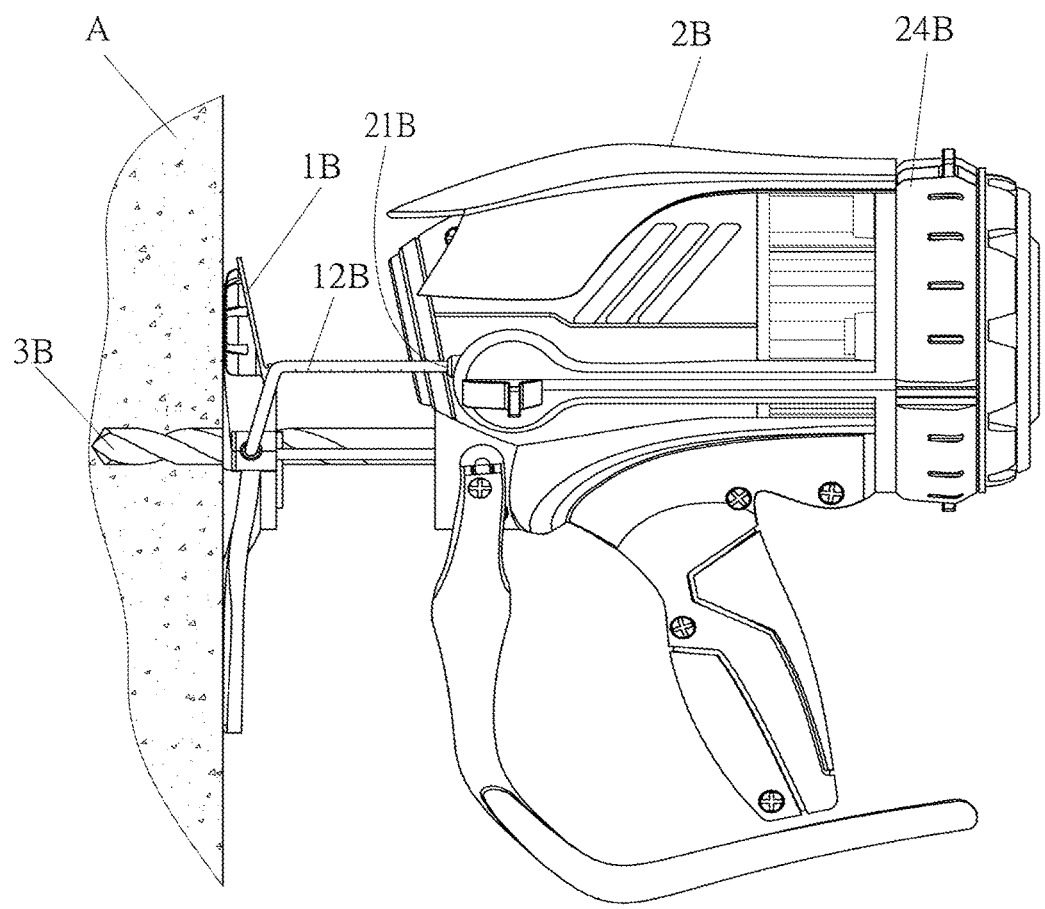

The guard plate 11B includes a pore 113B aligning with the through hole 23B (referring to FIG. 12) and is in parallel with the front end 11A of the electronic drill 100B and perpendicular to the orientation of the drill head 3B (referring to FIG. 12 and FIG. 13). In this embodiment, the guard plate 11B includes an upper plate 111B and a lower plate 112B detachably assembled together. The pore 113B is disposed at the upper plate 111B and the lower plate 112B includes a concaved dust box 1121B. The upper plate 111B further includes a pull ring 1111B at the upper side for easily disassembling the upper plate 111B from the lower plate 112B.

It should be noted that when carrying out the drilling, the dust box 1121B of the lower plate 112B can collect the dust produced during the drilling; therefore scattering of the dust can be effectively prevented. Additionally, pulling the pull ring 1111B on the upper plate 111B and disassembling the upper plate 111B from the lower plate 112B exposes the dust box 1121B, so that the dust collected in the dust box 1121B can be easily removed. The lower plate 112B may further include an arm 1122B extending from the dust box 1121B and away from the upper plate 111B as shown in FIG. 10. The arm 1122B may work together with the pull ring 1111B and helps maintaining the stability of the protection tool 1B when the protection tool 1B is pressed against the wall during the drilling.

Preferably, at least one of the rods 12B may include a scale 121B along the operation direction $L_1$ for showing the distance D of the guard plate 11B from the front end 11A.

Figure 11:
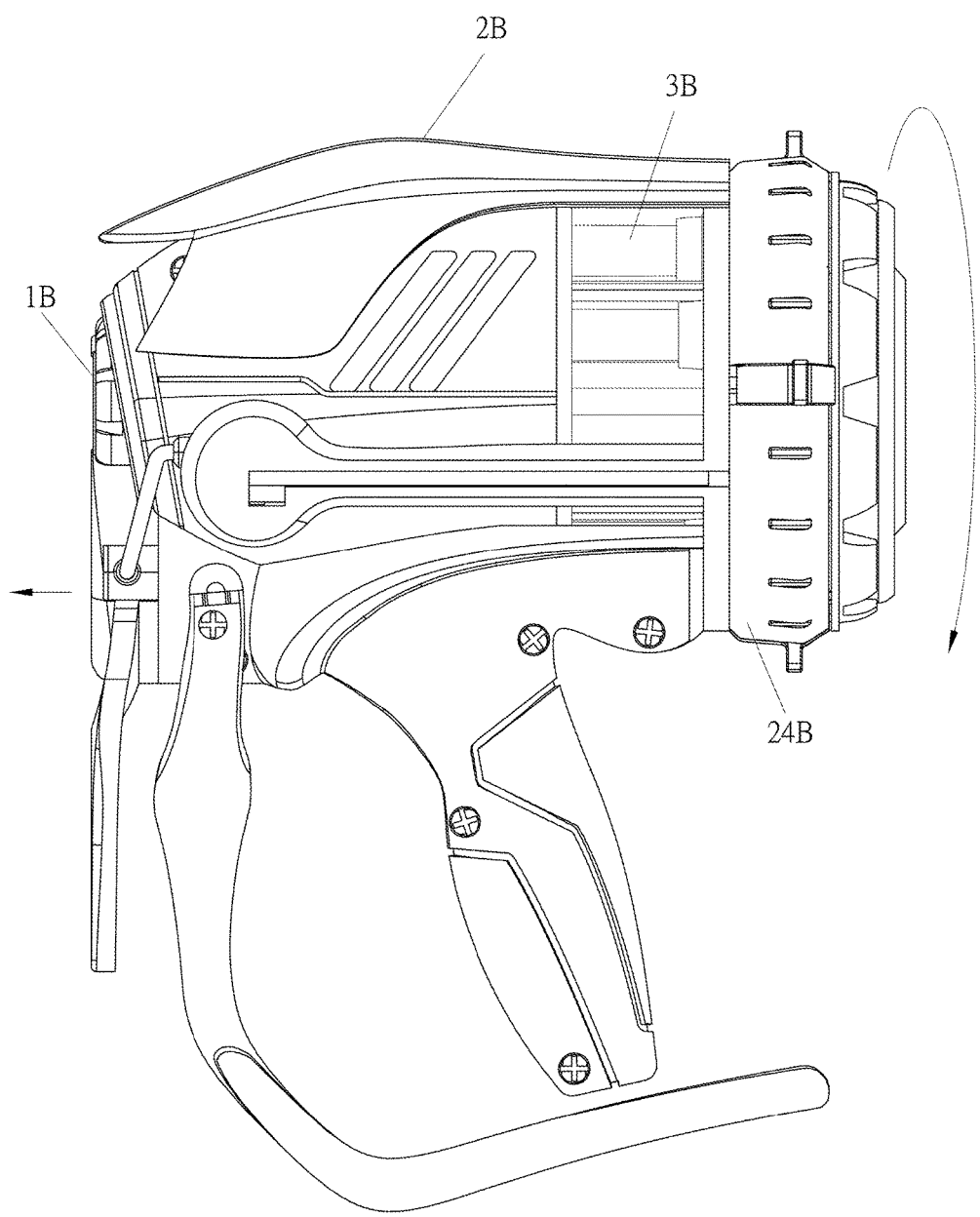
FIG. 11 to FIG. 13 are illustrations showing the operation of the electronic drill with revolving replaceable drilling heads according to the second embodiment of the invention.

Please refer to FIG. 11 to FIG. 13, which are illustrations showing the operation of the electronic drill with revolving replaceable drilling heads according to the second embodiment of the invention. Like the operation of the first embodiment, the wheel 24B is first rotated until the required drill head 3B is in position and can be pushed forward. The guard plate 11B is then pushed outward from the front end 11A until it reaches and withstands the wall A. During the drilling, as the guard plate 11B abuts tightly against the wall A and stays parallel with the front end 11A of the housing 2B, the drill head 3B can be well maintained perpendicular to the wall A throughout the drilling process, preventing drifting of the drill head 3B due to improper operation or vibration of the drill from happening. Additionally, as the drilling depth grows, the wall A will pushes the guard plate 11B and the supporting frame to retract back into the second grooves 21B of the housing 2B, indicating a shortening section of the rods 12B exposed outside the housing 2B, which in other words, the distance between the guard plate 11B and the front end 11A is getting shorter and the exact drilling depth (or the distance D) of the drill head 3B may be easily learned from the reading the scale 121B of one of the rods 12B.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A protection tool for an electronic drill, the electronic drill having a front end with a through hole located at the front end and a drill head extending through out the through hole, the protection tool moveably mounted at the front end of the electronic drill along an operation direction and comprising:
    a guard plate, comprising a pore aligning with the through hole, wherein the guard plate comprises an upper plate and a lower plate detachably assembled together, the upper plate comprising the pore and the lower plate comprising a concaved dust box and an arm extending from the dust box and away from the upper plate;
        wherein an abutting surface of the guard plate is formed cooperatively by the upper plate and the lower plate for abutting against a wall during drilling;
        wherein the arm also forms part of the abutting surface for stability when drilling;
        wherein dust produced during drilling is collected and contained in the dust box; and
    a supporting frame assembled with the guard plate and moveably mounted at the front end of the electronic drill along the operation direction, so that the guard plate is positioned at a variable distance from the front end according to the movement of the supporting frame with respect to the front end.

2. The protection tool of claim 1, wherein the supporting frame comprises a plurality of rods and the electronic drill comprises a plurality of grooves, each rods extending into a corresponding groove and moveable in the groove along the operation direction.

3. The protection tool of claim 2, wherein at least one of the rods comprises a scale along the operation direction for showing the distance of the guard plate from the front end.

4. The protection tool of claim 1, wherein the guard plate is in parallel with the front end of the electronic drill and perpendicular to the orientation of the drill head.

5. The protection tool of claim 1, wherein the upper plate comprises a pull ring for disassembling the upper plate from the lower plate.

* * * * *